(12) United States Patent  
Cabrera et al.

(10) Patent No.: US 8,303,248 B2  
(45) Date of Patent: Nov. 6, 2012

(54) SWASH PLATE ANTI-TORQUE MECHANISM

(75) Inventors: Pedro L. Cabrera, West Haven, CT (US); Stephen V. Poulin, Milford, CT (US); Francis D. Federici, Bridgeport, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 1254 days.

(21) Appl. No.: 12/088,894

(22) PCT Filed: Oct. 3, 2006

(86) PCT No.: PCT/US2006/038734  
§ 371 (c)(1), (2), (4) Date: Apr. 1, 2008

(87) PCT Pub. No.: WO2007/044374  
PCT Pub. Date: Apr. 19, 2007

(65) Prior Publication Data  
US 2008/0253891 A1 Oct. 16, 2008

Related U.S. Application Data

(60) Provisional application No. 60/724,036, filed on Oct. 5, 2005.

(51) Int. Cl.  
*B64C 27/605* (2006.01)

(52) U.S. Cl. ........ 415/229; 415/104; 416/102; 416/149; 416/150

(58) Field of Classification Search ............... 415/119, 415/229, 104; 416/102, 134 A, 135, 149, 416/150  
See application file for complete search history.

(56) References Cited

U.S. PATENT DOCUMENTS

| | | | | |
|---|---|---|---|---|
| RE23,448 E | * | 12/1951 | Pullin | 416/20 R |
| 2,969,117 A | * | 1/1961 | Schon | 416/114 |
| 3,274,897 A | | 9/1966 | Reinke | |
| 3,460,628 A | * | 8/1969 | Tankersley | 416/213 R |
| 3,768,923 A | * | 10/1973 | Fradenburgh | 416/89 |
| 3,782,854 A | | 1/1974 | Rybicki | |
| 3,967,918 A | | 7/1976 | Mouille et al. | |
| 4,297,078 A | | 10/1981 | Martin | |
| 5,507,627 A | | 4/1996 | Okazaki | |

OTHER PUBLICATIONS

Search Report PCT/US06/38734.

* cited by examiner

Primary Examiner — Ninh H Nguyen  
(74) Attorney, Agent, or Firm — Carlson, Gaskey & Olds PC

(57) ABSTRACT

An anti-torque mechanism which permits a full range of swashplate assembly motion. The anti-torque mechanism generally includes an anti-torque shaft and a compound bearing mounted thereto to provide five-degrees-of-freedom (spherical-linear-elastomeric) so as to permit a swashplate attachment point to move axially in response to pitch input; pivot in response to swashplate tilt; and move in/out in the radial direction.

20 Claims, 6 Drawing Sheets

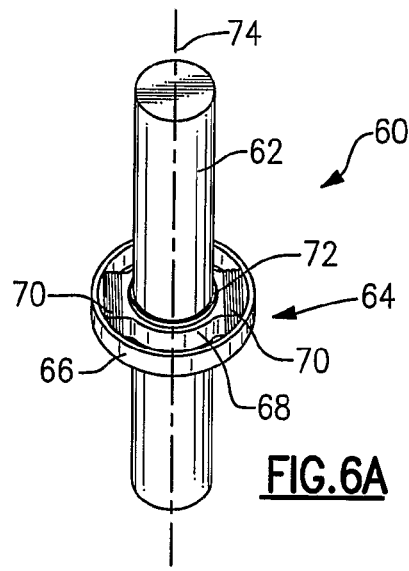
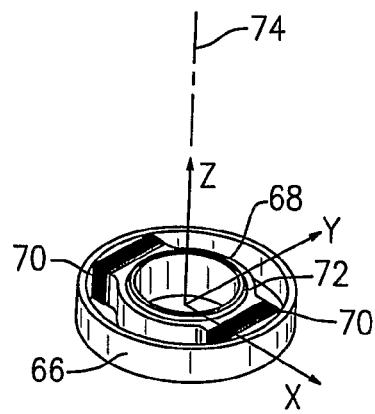
FIG.6A
FIG.6B
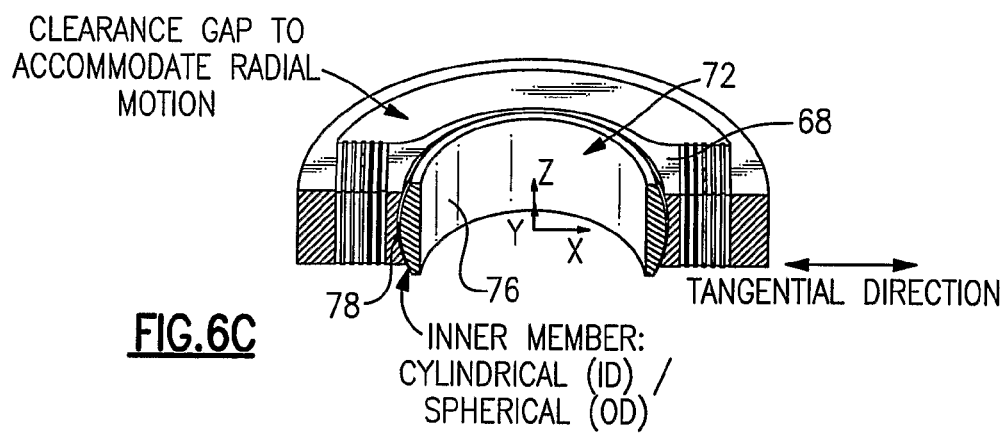
CLEARANCE GAP TO ACCOMMODATE RADIAL MOTION
INNER MEMBER: CYLINDRICAL (ID) / SPHERICAL (OD)
TANGENTIAL DIRECTION
FIG.6C
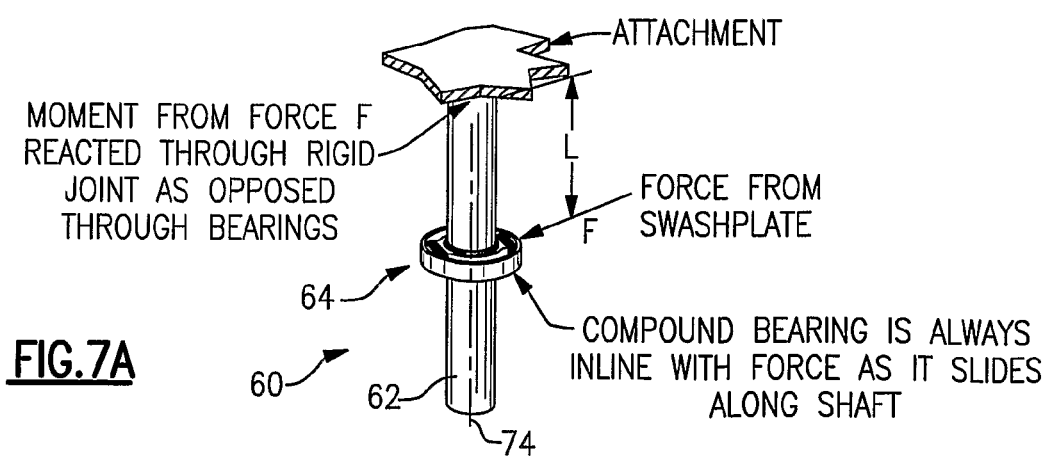
ATTACHMENT
MOMENT FROM FORCE F REACTED THROUGH RIGID JOINT AS OPPOSED THROUGH BEARINGS
FORCE FROM SWASHPLATE
COMPOUND BEARING IS ALWAYS INLINE WITH FORCE AS IT SLIDES ALONG SHAFT
FIG.7A

SWASH PLATE ANTI-TORQUE MECHANISM

The present application claims priority to U.S. Provisional Patent Application Ser. No. 60/724,036, filed Oct. 5, 2005.

This invention was made with government support under U.S. Navy Contract No. N00019-03-G-0003, Delivery Order 0025. The government therefore has certain rights in this invention.

BACKGROUND OF THE INVENTION

The present invention relates to a rotary-wing aircraft swashplate assembly, and more particularly to a swashplate assembly with a compound bearing having degrees of freedom in axial, radial and pivot directions so as to replace one or both of the stationary and/or rotating scissors.

Control of a rotary-wing aircraft is affected through cyclic and collective pitch control. Blade pitch control of a rotary-wing aircraft main rotor system is typically achieved through a swashplate assembly which transfers the motion of non-rotating servo-driven control members within a stationary field to the rotating members within a rotational field.

The swashplate assembly generally includes two rings connected by a series of bearings with one swashplate ring connected to the airframe/gearbox (stationary field), and the other swashplate ring connected to a rotor hub (rotational field). Apart from rotary motion, the rotationally stationary and rotational swashplate otherwise move as a unitary component. The swashplate assembly also includes a pivoted link device typically referred to as a "scissors" to coordinate rotationally stationary or rotational swashplate motion within the respective field.

A rotating scissor assembly interconnects the rotating swashplate to the rotor hub and a stationary scissor assembly interconnects the airframe/gearbox to the stationary swashplate. The rotational swashplate rotates relative the stationary swashplate.

Each scissor assembly includes an upper link and a lower link each attached together through a bolt and respective journal-thrust bearing. The lower link of the rotating scissor assembly is typically attached to the rotating swashplate by a spherical bearing. A similar arrangement exists for the stationary scissor assembly.

Although operationally effective, one disadvantage of the existing two-link scissor assembly design is the relatively high part count in which one typical scissor assembly may include two links, three bolts, five beatings and other hardware.

Another disadvantage is directly related to the innate geometric inefficiency of the scissor design in transmitting torque to the swashplate. That is, the conventional two-link scissor assembly design locates journal-thrust bearings a distance from the swashplate force. The moment introduced by this offset results in a couple at the journal-thrust bearings, which may be greater in magnitude than the applied swashplate force. To abate these reaction forces the links need to be relatively wide, which may result in a relatively heavy scissor assembly.

A more esoteric disadvantage of the existing two-link design is that by using the journal bearings in a rotating motion, the pressure term and the velocity term in the PV (pressure*velocity) factor become coupled such that PV, which is used to predict the life of the bearing, is unaffected by a change in bearing radius. The reason for this is that although pressure is inversely proportional to the bearing radius, the tangential velocity is linearly proportional to the radius, thereby canceling each other and leaving behind only the length of the bearing as the germane variable. The result is that the lugs of the links have to be relatively wide which then forces the body of the link to increase in cross-section which further exacerbating the weight issue.

Another disadvantage of the conventional two-link scissor design is related to space constraints. In certain rotor head configurations, the space between the rotor hub and the swashplate may limit optimum placement of the rotating scissor assembly (which is as far as possible from the rotor head axis of rotation). This inboard location results in an amplification of the reaction load due to the relatively small moment arm which counteracts the swashplate torque (in some rotary-wing aircraft, an amplification factor of 3 from the pitch control rod loads is necessary). The overall result is that the scissor links and the bolts which attach the scissor assembly also have to be of significant robustness to manage the magnitude of the vibratory load.

Furthermore, conventional two-link scissor assembly designs may require "shimming" to eliminate manufacturing tolerances at assembly. This procedure preloads the bolt such that the journal-thrust bearings remain in contact during operation. Shimming may be relatively time consuming and may increase the possibility of foreign object damage (FOD).

Accordingly, it is desirable to provide an uncomplicated, light weight, anti-torque mechanism for a swashplate assembly having degrees of freedom in axial, radial and pivot directions so as to replace one or both of the stationary and/or rotating scissor assembly.

SUMMARY OF THE INVENTION

A swashplate assembly according to the present invention includes an anti-torque mechanism which transmits torque and coordinates rotation therebetween yet permit a full range of collective and cyclic motion. The anti-torque mechanism generally includes an anti-torque shaft and a compound bearing mounted thereto to provide five-degrees-of-freedom (spherical-linear-elastomeric) which provides swashplate attachment point motion axially in response to collective pitch input; pivotally in response to swashplate tilt; and radially in response to offset. The compound bearing generally includes an outer member, an inner member mounted within the outer member through a resilient member and a spherical bearing mounted within the inner member.

The anti-torque mechanism requires only the single spherical bearing and further reduces part count by replacing two links and two bolts of a conventional scissors arrangement with a single rigid anti-torque shaft. The anti-torque mechanism facilitates optimal placement of the compound bearing in-line with the swashplate force which is reacted through the rigid anti-torque shaft rather than through a couple at the journal-thrust bearing of a conventional scissor assembly arrangement. Moreover, where space between the swashplate and the hub is relatively limited, the anti-torque mechanism places the swashplate attachment point a relatively significant distance from the rotor axis of rotation to reduce tangential loads on the compound bearing.

Another anti-torque mechanism utilizes a compound bearing with a resilient member that has an arcuate component to increase load reaction within a desired direction.

Another anti-torque mechanism replaces the elastomeric pads with a pair of journal-thrust bearings which accommodate the relatively small radial vibration at the attachment point.

The present invention therefore provides an uncomplicated, light weight, anti-torque mechanism for a swashplate assembly having degrees of freedom in axial, radial and pivot directions so as to replace one or both of the stationary and/or rotating scissor assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 6A is a perspective view of a swashplate anti-torque mechanism;

FIG. 6B is a perspective view of a compound bearing for use with the swashplate anti-torque mechanism;

FIG. 6C is a sectional view of the compound bearing of FIG. 6B;

FIG. 7A is a perspective view of a swashplate anti-torque mechanism illustrating swashplate forces thereon;

DETAILED DESCRIPTION OF THE PREFERRED EMBODIMENT

Figure 1:
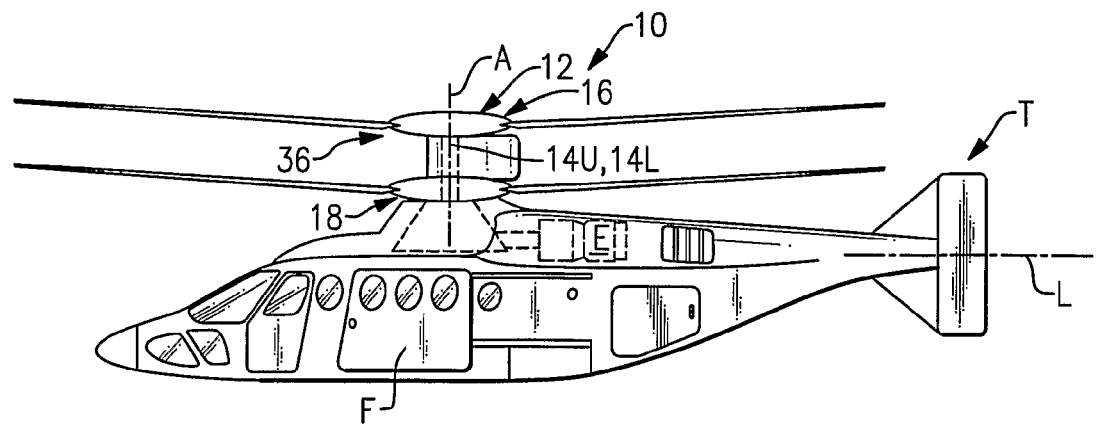
FIG. 1 is a general perspective side view of an exemplary rotary-wing aircraft embodiment for use with the present invention.

FIG. 1 illustrates an exemplary vertical takeoff and landing (VTOL) rotary-wing aircraft 10 having a dual, counter-rotating, coaxial rotor system 12 which rotates through a counter-rotating main rotor shaft 14U, 14L (FIG. 2) about an axis of rotation A. The aircraft 10 includes an airframe F which supports the dual, counter rotating, coaxial rotor system 12 as well as an optional translational thrust system T which provides translational thrust during high speed forward flight generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircraft will also benefit from the present invention.

A main gearbox G is driven by one or more engines (illustrated schematically at E) drives the rotor system 12. The translational thrust system T may also be driven by the same main gearbox G which drives the rotor system 12. As shown, the main gearbox G may be interposed between the gas turbine engines E, the rotor system 12 and the translational thrust system T.

Figure 2:
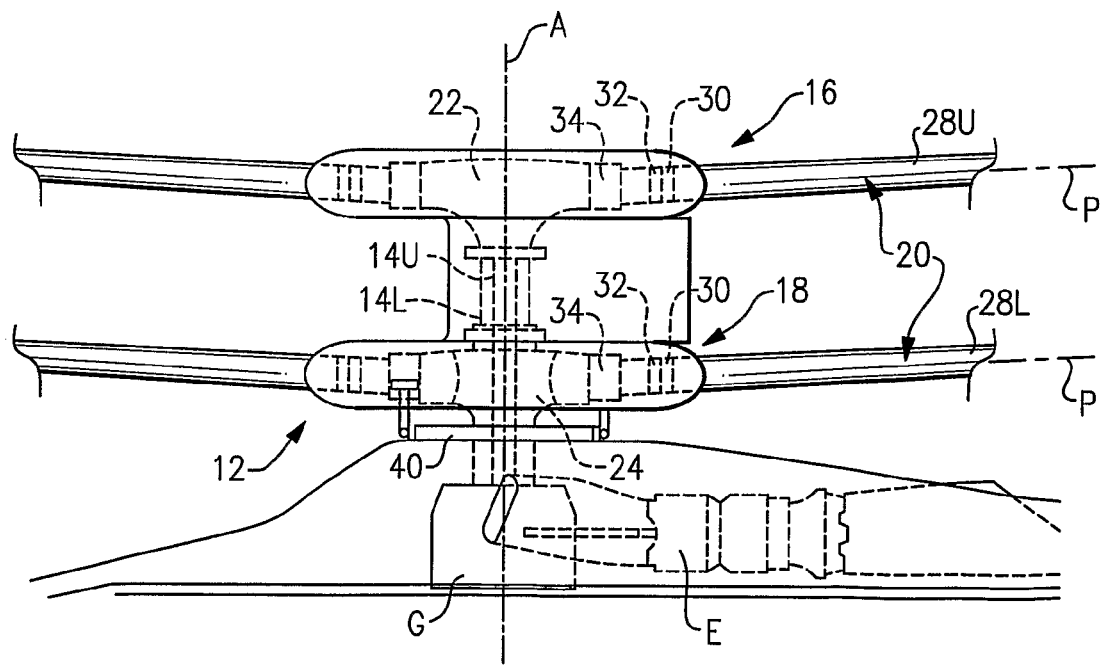
FIG. 2 is an expanded partial phantom view of a dual counter-rotating coaxial rotor system of the aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L which rotates the lower hub assembly 24.

The plurality of the main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32 which supports the rotor blade spindle 30 within a bearing housing 34 to permit the rotor blade 28 to pitch about a pitching axis P. It should be understood that various blade attachments may also be utilized with the present invention.

Figure 3:
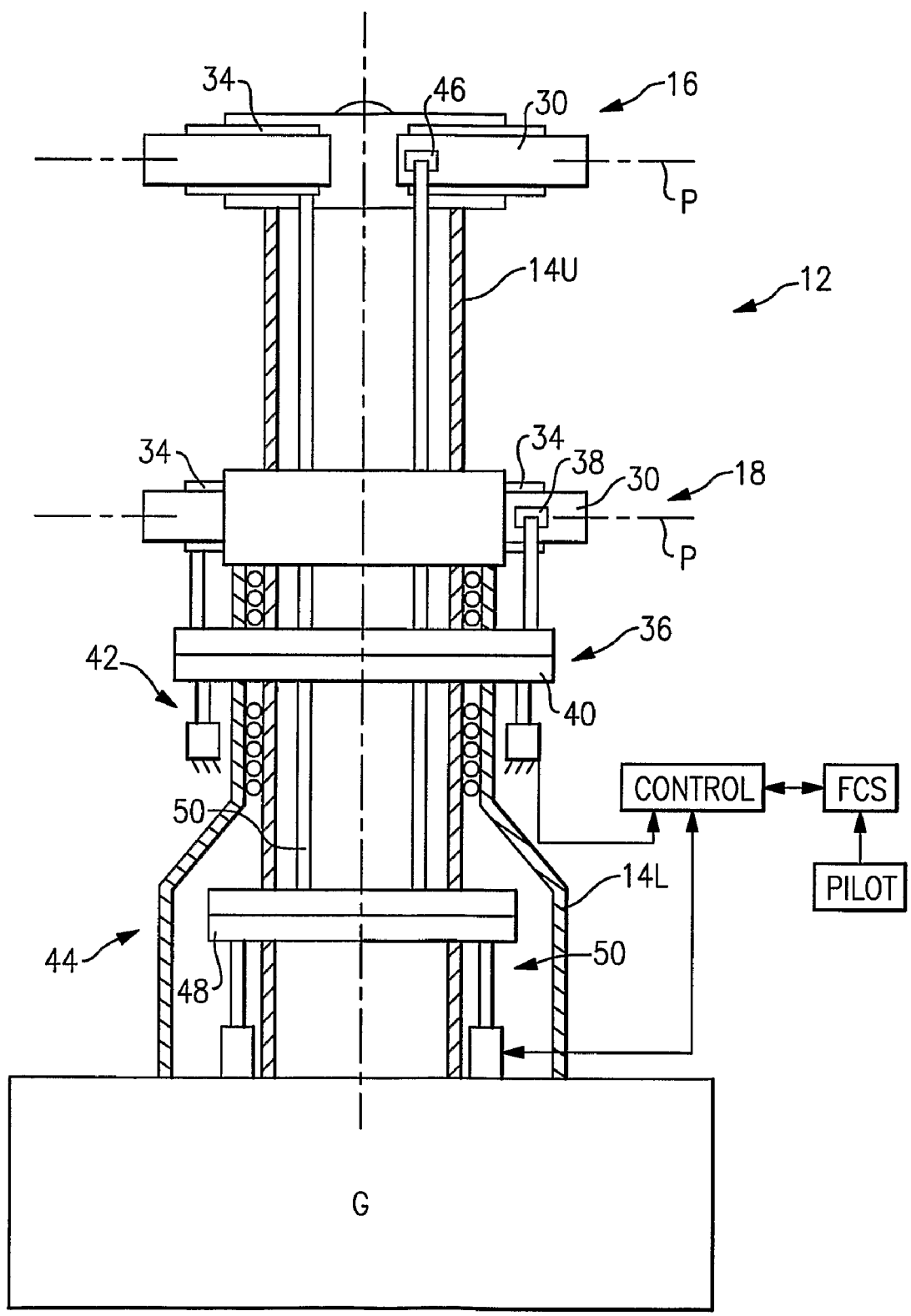
FIG. 3 is a longitudinal sectional view through a dual counter-rotating coaxial rotor system along a rotor system axis of rotation.

Referring to FIG. 3, the rotor system 12 includes a lower rotor control system 36 with a rotor blade pitch control horn 38 mounted for rotation with the rotor blade spindle 30 of each lower rotor blade 28. Each rotor blade pitch control horn 38 is linked to a servo mechanism 42 through a lower swashplate assembly 40 to impart the desired pitch control thereto.

An upper rotor control system 44 includes a rotor blade pitch control horn 46 mounted for rotation with the rotor blade spindle 30 of each upper rotor blade 28. Each rotor blade pitch control horn 46 is linked to a servo mechanism 50 through an upper swashplate assembly 48 to impart the desired pitch control thereto.

The swashplate assemblies 40, 48 translate and/or tilt by the separate servo mechanisms 42, 50 such that each rotor system 36, 44 may be independently controlled in both cyclic and collective pitch in response to a rotor control system (illustrated schematically). Generally, motion of the swashplate assemblies 40, 48 along the rotor axis A will cause the respective rotor system 36, 44 to vary pitch collectively while tilting of the swashplate assemblies 40, 48 with respect to the rotor axis A will cause the respective rotor systems 36, 44 to vary pitch cyclically to tilt the rotor disk. The rotor control system preferably communicates with a flight control system which receives pilot inputs from controls such as a collective stick, cyclic stick, foot pedals and the like.

It should be understood that the pitch control rods and servo mechanisms 42, 50 for the respective upper rotor system 16 and lower rotor system 18 may be located internally or externally to the respective main rotor shaft 14U, 14L and that various pitch control rods, links and servo mechanisms at various locations for cyclic and collective pitch control of the rotor system 12 may be utilized with the present invention.

Figure 4A:
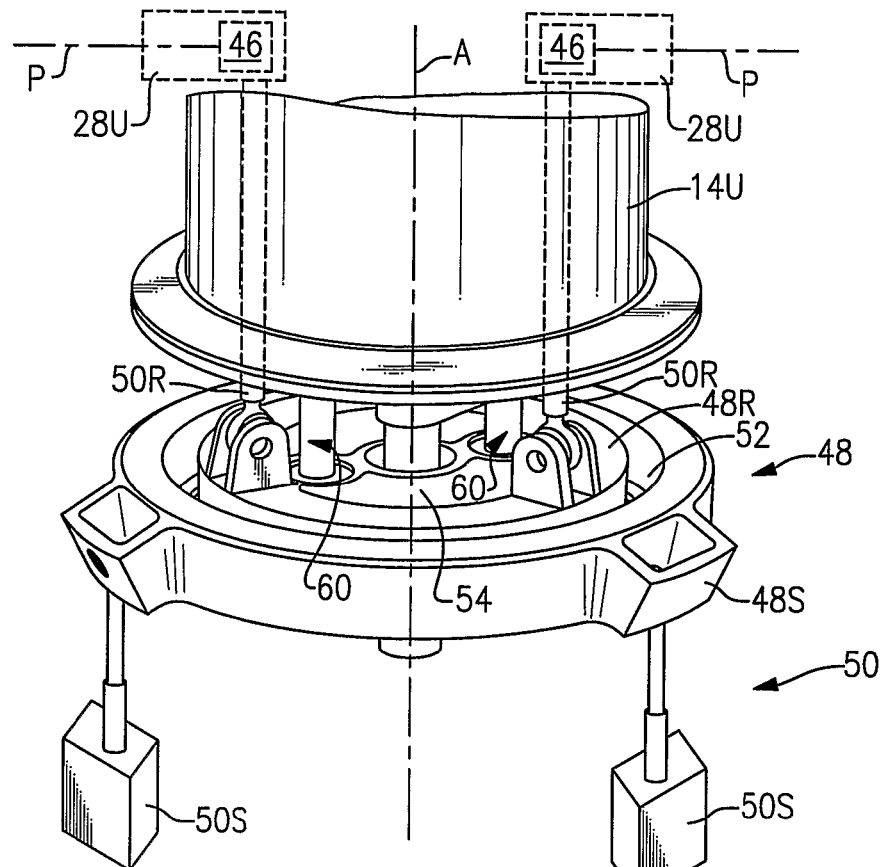
FIG. 4A is an expanded perspective view of a swashplate assembly.

Referring to FIG. 4A, the upper swashplate assembly 48 includes a rotationally stationary swashplate 48S and rotational swashplate 48R which rotates relative to the rotationally stationary swashplate 48S through a bearing system 52 therebetween. The swashplate assembly 48 is mounted through a spherical ball joint or uniball assembly 54 which permits tilting and translation of the swashplate assembly 48 relative to axis A as generally understood.

The pitch control rod and servo mechanism 50 generally includes a multitude of servos 50S linked to the rotationally stationary swashplate 48S and a multitude of pitch control rods 50R each between the rotational swashplate 48R and one rotor blade pitch control horn 46 of every upper rotor blade 28U (only two illustrated schematically). Pitch control commands from the rotor control system drive the servos 50S to impart collective and cyclic control to the rotationally stationary swashplate 48S. The collective and cyclic motion of the rotationally stationary swashplate 48S within a fixed rotational field are transferred to the rotational swashplate 48R in a rotational field through the swashplate bearing system 52 which moves in coordination therewith. The collective and cyclic movement of the rotational swashplate 48R imparts pitch control loads to each rotor blade 28U through the associated pitch control rod 50R.

Figure 4B:
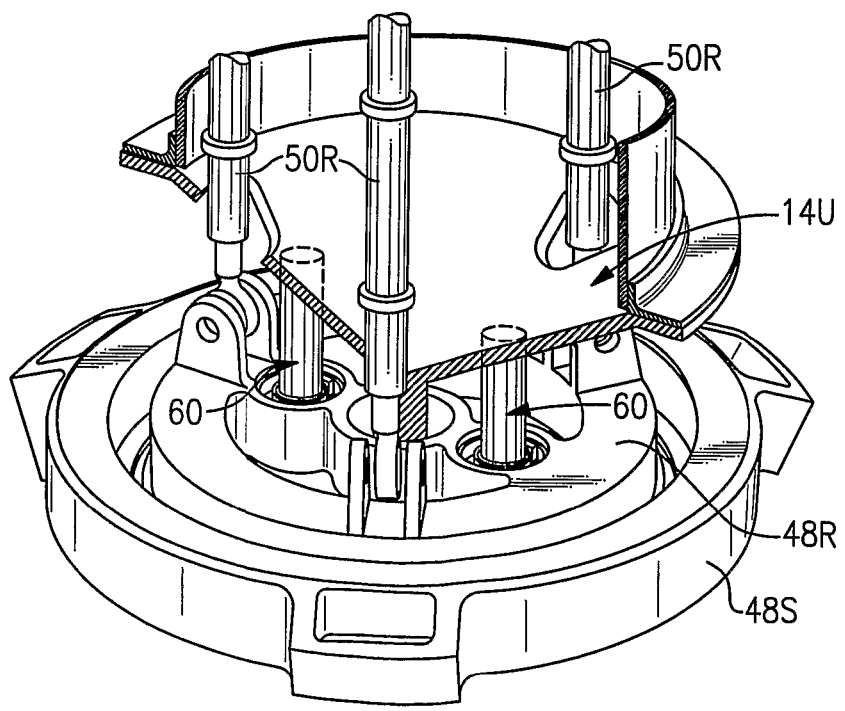
FIG. 4B is a sectional perspective view of the swashplate assembly of FIG. 4A.

A swashplate anti-torque mechanism 60 is mounted between the rotational swashplate 48R and a rotational component such as the rotor shaft 14U of the rotor system 12 (also illustrated in FIG. 4B) to transmit torque and coordinate rotation therebetween yet permit a full range of swashplate assembly 48 motion. Although the upper swashplate assembly 48 is described as the illustrated embodiment herein, it should be understood that the anti-torque mechanism 60 may also be utilized on the lower swashplate assembly 40 in a generally similar manner. In addition, although the anti-torque mechanism 60 is utilized within the rotational field between the rotational swashplate 48R and the upper rotor shaft 14U, another anti-torque mechanism may also be utilized between the rotationally stationary swashplate 48S and a grounding component in the fixed field such as the airframe/gearbox for both or either of the upper and lower swashplate assemblies 40, 48. Moreover, the anti-torque mechanism 60 may be utilized in systems other than swashplate assemblies.

Figure 4C:
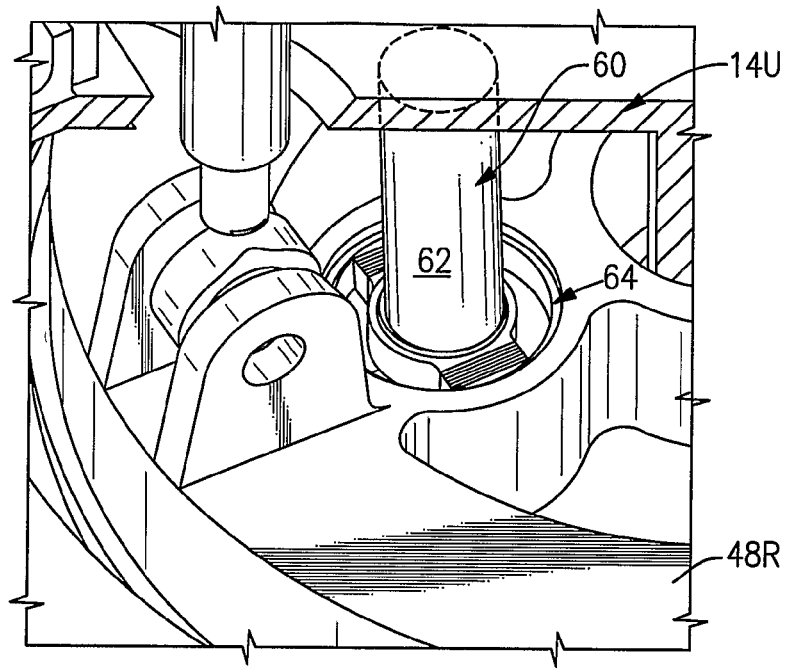
FIG. 4C is an expanded perspective view of the swashplate assembly of FIG. 4A illustrating a swashplate anti-torque mechanism mounted therein.

Referring to FIG. 4C, the anti-torque mechanism 60 generally includes an anti-torque shaft 62 mounted to the rotor shaft 14U (for a rotational field mounted anti-torque mechanism or to, for example, the airframe/gearbox for a stationary field mounted anti-torque mechanism) and a compound bearing 64 mounted to the anti-torque shaft 62 and the rotational swashplate 48R (for a rotational field mounted anti-torque mechanism or to the rotationally stationary swashplate for a stationary field mounted anti-torque mechanism).

Figure 5:
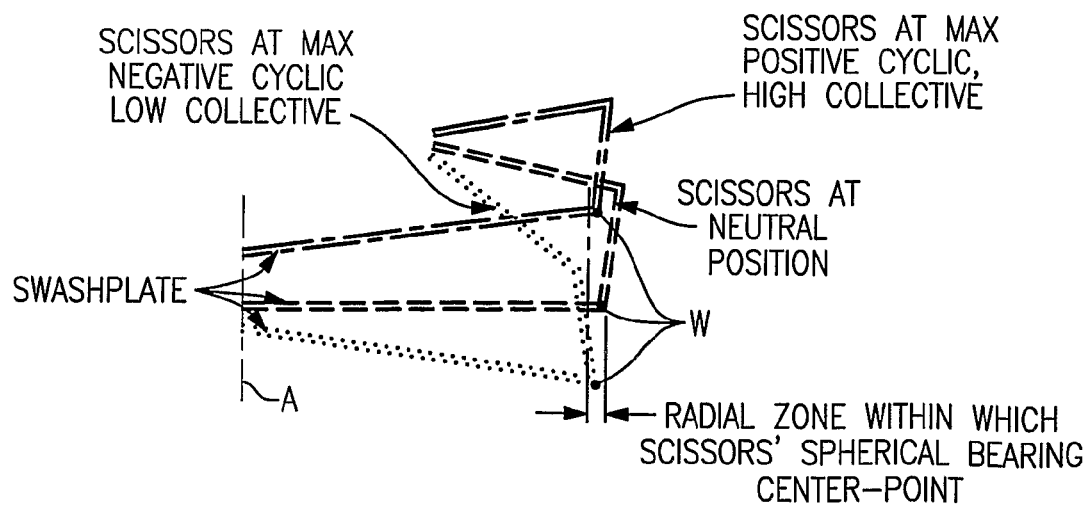
FIG. 5 is a schematic geometric representation of the movement of a swashplate attachment point movement in response to swashplate articulation.

By comparing the two extremes of swashplate motion—maximum positive cyclic at high collective and maximum negative cyclic at low collective—a swashplate attachment point W (FIG. 5) for the anti-torque mechanism 60 generally moves up and down within a relatively small radial zone. The anti-torque mechanism 60 provides degrees of freedom in axial, radial and pivot directions to permit the full range of swashplate assembly 48 motion. The anti-torque mechanism 60 accommodates five degrees of freedom while reacting torque from the swashplate assembly 48. The anti-torque mechanism 60 permits the swashplate attachment point W to move axially in response to pitch input; pivot in response to swashplate tilt; and move in/out in the radial direction relative to axis A.

Referring to FIG. 6A, the compound bearing 64 of the anti-torque mechanism 60 generally includes an outer member 66, an inner member 68 mounted within the outer member 66 through a resilient member 70 and a spherical bearing 72 mounted within the inner member 68. The anti-torque shaft 62 defines an axis 74. The compound bearing 64 is mounted to the anti-torque shaft 62 to provide five-degrees-of-freedom (spherical-linear-elastomeric) movement relative the axis 74 (FIG. 6B). The spherical bearing 72 has a cylindrical inner surface 76 for sliding movement along the anti-torque shaft 62 and a spherical outer surface 78 for pivotal movement within the inner member 68 (FIG. 6C)

The inner member 68 is flanked by a set of the resilient members 70 which include flat elastomeric pads/plates to resiliently connect the inner member 68 to the outer member 66. Each resilient member 70 is preferably stiff in the tangential direction, while soft enough to allow the radial degree of freedom. The resilient member 70 is preferably sufficiently stiff in a tangential direction to permit sufficient swashplate force torque reaction while suitably soft to allow motion in the radial direction.

Figure 7B:
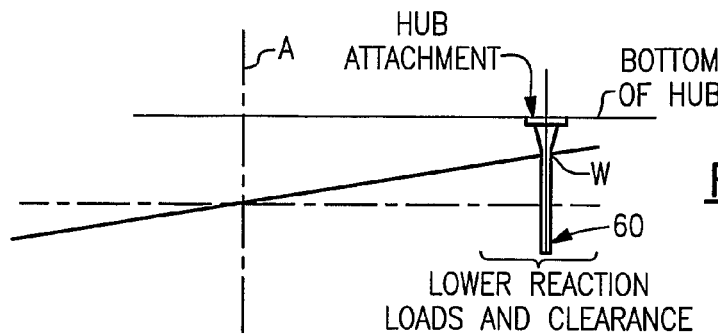
FIG. 7B is a schematic view of the swashplate anti-torque mechanism illustrating the lower reaction loads and increased clearance provided in comparison to the prior art scissor assembly of FIG. 7C.
Figure 7C:
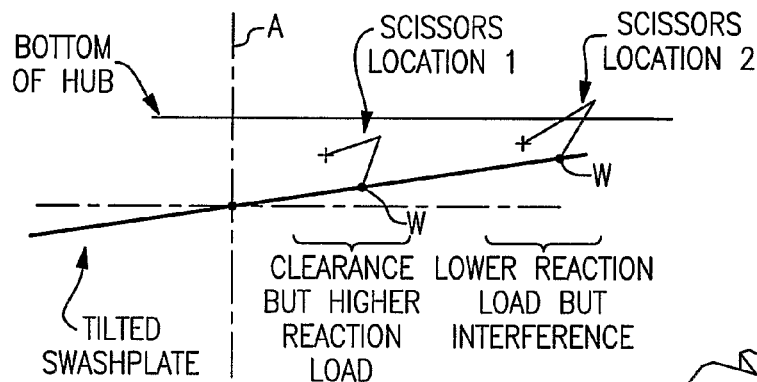
FIG. 7C is a prior art schematic view of scissor clearance in relation to a tilted swashplate illustrating the relationship between reaction load and potential interference.
Figure 9:
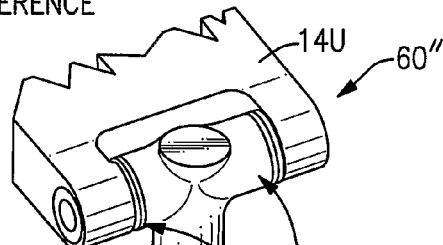
FIG. 9 is a perspective view of another embodiment of the swashplate anti-torque mechanism utilizing general thrust bearings.

The anti-torque mechanism 60 requires only a single bearing and reduces part count by replacing two links and two bolts of a conventional scissor assembly with the single anti-torque shaft 62. The anti-torque mechanism 60 also optimally places the compound bearing 64 in-line with the swashplate force (FIG. 7A) which is reacted through the anti-torque shaft 62 rather than a conventional scissors arrangement which reacts the moment though a couple at the journal-thrust bearing. Moreover, where space between the swashplate and the rotor hub is limited, the anti-torque mechanism 60 locates the swashplate attachment point W a significant distance from the rotor axis of rotation A (FIG. 7B) which results in a reduced reaction load at the compound bearing 64 yet provides significant clearance compared to the conventional scissor arrangement (FIG. 7C). The reason for this is that the reacted swashplate load originates from tilting of the pitch control rods which imparts a torque on the swashplate. Since torque is a linear function of the moment arm, the further the anti-torque mechanism 60 is attached from the rotor axis of rotation A, the less the force required to react this torque. For example, in one helicopter configuration, the force needed to rotate the swashplate is decreased by 62% compared to conventional scissors-attachment location. This ultimately result is a decrease in the amplitude of vibratory load transmitted to the rotor hub.

As generally understood by one of skill in the art, the sizing of the anti-torque mechanism 60 is dependent upon the particular swashplate embodiment. One pragmatic way, however, to size the anti-torque shaft 62 is in response to the vibratory load spectrum of typical rotating scissor assemblies. This calculation provides the minimum diameter of the anti-torque shaft. One pragmatic way of sizing the compound bearing 64 is in response to an estimate of the heat that would be generated during operation and comparison of that estimated heat load to that which is accommodated by particular materials. This heat load is a direct result of the energy dissipated by friction and is related to the power per unit area, more commonly known as PV (pressure*velocity). In one swashplate embodiment example, the swashplate is tilted to a maximum cyclic position and is rotated at maximum rpm such that an average sliding speed of 216 fpm results. The calculations yielded a minimum bearing height of 1.5 inches, which results in a PV factor comparable to commercially available linear bearings.

Figure 8:
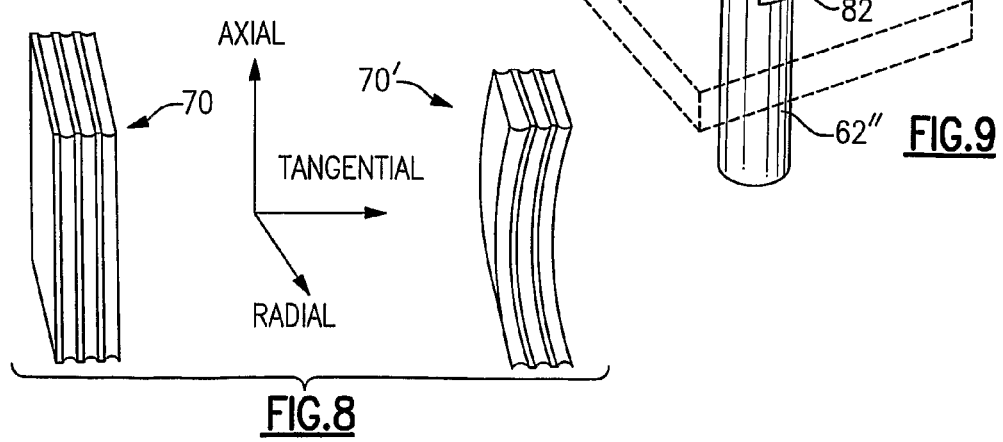
FIG. 8 is another embodiment of a resilient member utilized within the compound bearings.

Referring to FIG. 8, a resilient member 70' may have an arcuate or curved component to increase load reaction in a desired direction. For example only, by curving the arcuate resilient member 70' out of a plane which contains the axial vector and radial vector, the anti-torque mechanism 60 will provide an increased load reaction along the axial direction as the arcuate resilient member 70' resists axial movement. Such increased load reaction may likewise be provided in other directions by otherwise curving a component of the arcuate resilient member 70'.

Referring to FIG. 12, another embodiment of the anti-torque mechanism 60' eliminates the elastomeric pads which are replaced with a pair of journal-thrust bearings 80 at the previously rigid anti-torque shaft 62' attachment location. That is, the shaft 62' is attached to the rotor shaft 14U (for a rotational field mounted anti-torque mechanism or to the airframe/gearbox for stationary field mounted anti-torque mechanism) through the journal-thrust bearings 80 to accommodate the relatively small radial vibration. The swashplate 48R is then directly attached through a spherical bearing 82.

Although the anti-torque mechanism 60 has been described for use in connection with a swashplate assembly, it should be noted that the compound bearing itself may be used in various applications where, for example only, an apparatus that may need to slide and reduce vibration transfer therethrough.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An anti-torque mechanism offset and generally parallel to a rotor system axis of rotation comprising:
   an outer member defined about an axis;
   an inner member defined about said axis;
   a resilient member mounted to said outer member and said inner member; and
   a spherical bearing mounted within said inner member, said spherical bearing pivotable about said axis.

2. The mechanism as recited in claim 1, wherein said resilient member is relatively stiff in a tangential direction and resilient in a radial direction.

3. The mechanism as recited in claim 2, wherein said resilient member is a generally planar member transverse to said tangential direction.

4. The mechanism as recited in claim 2, wherein said resilient member includes an at least partially arcuate component out of an axial-radial plane.

5. The mechanism as recited in claim 1, wherein said spherical bearing defines a spherical outer diameter and a cylindrical inner diameter, said cylindrical inner diameter slidable along a shaft rigidly fixed at.

6. The mechanism as recited in claim 1, further comprising a shaft rigidly fixed at one end section, said shaft defined along said axis.

7. The mechanism as recited in claim 1, wherein said rotor system is a main rotor system of a rotary-wing aircraft.

8. An anti-torque mechanism offset and generally parallel to a rotor system axis of rotation comprising:
   a shaft which defines an axis;
   a journal-thrust bearing mounted between said shaft and a first component; and
   a spherical bearing pivotable relative said axis, said spherical bearing mounted to a second component slidably mounted along said shaft.

9. The mechanism as recited in claim 8, wherein said second component includes a swashplate.

10. The mechanism as recited in claim 8, wherein said rotor system is a main rotor system of a rotary-wing aircraft.

11. The mechanism as recited in claim 8, wherein said shaft is rigidly fixed at one end section.

12. A rotor system comprising:
    a swashplate assembly pivotally mounted about a central pivot point defined along a rotor system axis of rotation;
    a compound bearing mounted within said swashplate assembly radially displaced from said rotor system axis of rotation; and
    a shaft mounted through said compound bearing, said shaft offset and generally parallel to said rotor system axis of rotation, such that said compound bearing accommodates axial, radial and tangential motion of said swashplate assembly relative said shaft.

13. The system as recited in claim 12, wherein said shaft is mounted to a rotational component and said compound bearing is mounted within a rotational swashplate of said swashplate assembly.

14. The system as recited in claim 13, wherein said rotational component includes a rotor hub which rotates about said rotor system axis of rotation.

15. A rotor system comprising:
    a swashplate assembly pivotally mounted about a central pivot point defined along a rotor system axis of rotation;
    a compound bearing mounted within said swashplate assembly radially displaced from said rotor system axis of rotation; and
    a shaft mounted through said compound bearing such that said compound bearing accommodates axial, radial and tangential motion of said swashplate assembly relative said shaft, wherein said shaft is mounted to a rotationally fixed component and said compound bearing is mounted within a rotational stationary swashplate of said swashplate assembly.

16. The system as recited in claim 15, wherein said rotationally fixed component includes an airframe component.

17. The system as recited in claim 15, wherein said rotationally fixed component includes a gearbox.

18. A method of mounting a swashplate to a rotor system comprising the steps of:
    (A) mounting a shaft to a first component, the shaft offset and generally parallel to a rotor system axis of rotation; and
    (B) mounting a compound bearing to a swashplate such that said compound bearing engages the shaft to accommodate axial, radial and tangential motion of the swashplate relative to the shaft.

19. A method as recited in claim 18, wherein said step (A) further comprises mounting the shaft within a rotational field.

20. A method as recited in claim 18, wherein said step (A) further comprises mounting the shaft within a stationary field.

* * * * *